(12) United States Patent
Spector

(10) Patent No.: US 10,841,173 B2
(45) Date of Patent: Nov. 17, 2020

(54) SYSTEM AND METHOD FOR DETERMINING RESOURCES UTILIZATION IN A VIRTUAL NETWORK

(71) Applicant: imVision Software Technologies Ltd., Ramat Gan (IL)

(72) Inventor: Yoav Spector, Tel-Aviv (IL)

(73) Assignee: imVision Software Technologies Ltd., Ramat Gan (IL)

(*) Notice: Subject to any disclaimer, the term of this patent is extended or adjusted under 35 U.S.C. 154(b) by 62 days.

(21) Appl. No.: 15/657,514

(22) Filed: Jul. 24, 2017

(65) Prior Publication Data

US 2018/0026853 A1    Jan. 25, 2018

Related U.S. Application Data

(60) Provisional application No. 62/366,333, filed on Jul. 25, 2016.

(51) Int. Cl.
| | |
|---|---|
| *H04L 12/24* | (2006.01) |
| *H04L 12/26* | (2006.01) |
| *H04L 12/911* | (2013.01) |
| *H04L 12/46* | (2006.01) |

(52) U.S. Cl.
CPC ........ *H04L 41/147* (2013.01); *H04L 12/4641* (2013.01); *H04L 41/0896* (2013.01); *H04L 41/5009* (2013.01); *H04L 43/0876* (2013.01); *H04L 47/70* (2013.01)

(58) Field of Classification Search
None
See application file for complete search history.

(56) References Cited

U.S. PATENT DOCUMENTS

| | | | | |
|---|---|---|---|---|
| 2011/0276982 | A1* | 11/2011 | Nakayama | G06F 9/505 718/105 |
| 2016/0034835 | A1* | 2/2016 | Levi | H04L 67/10 705/7.23 |
| 2016/0248624 | A1* | 8/2016 | Tapia | H04L 41/5009 |
| 2016/0277308 | A1* | 9/2016 | Challa | H04L 67/42 |

* cited by examiner

*Primary Examiner* — Nasser M Goodarzi
*Assistant Examiner* — Terrika Peterson
(74) *Attorney, Agent, or Firm* — M&B IP Analysts, LLC

(57) ABSTRACT

A system and method for determining optimized resources utilization in a virtual network. The method includes collecting a computing resource parameter from a virtual network, where the computing resource parameter includes at least performance measurements of computing resources in the virtual network; accessing a key performance indicator, where the key performance indicator includes measurement of network traffic performance; and determining, based on the computing resource parameter and the key performance indicator, an optimized resource parameter over a period of time that indicates a usage rule for a computing resource component.

15 Claims, 3 Drawing Sheets

SYSTEM AND METHOD FOR DETERMINING RESOURCES UTILIZATION IN A VIRTUAL NETWORK

CROSS-REFERENCE TO RELATED APPLICATIONS

This application claims the benefit of U.S. Provisional Application No. 62/366,333 filed on Jul. 25, 2016, the contents of which are hereby incorporated by reference.

TECHNICAL FIELD

The present disclosure relates generally to techniques for determining resource utilization, and more particularly, to techniques for predicting resource utilization for use in virtualized network environments.

BACKGROUND

The concept of virtualization is currently in widespread commercialized use. A virtual machine is an entity that behaves like a computer, e.g. running an operating system and executing an application, but is separated from the underlying hardware resources used to perform and complete those tasks. A virtual machine is granted access to a portion of the available hardware resources from a hardware system (e.g., CPU, memory, disk space, network communication, etc.). The amount of resources allocated to a particular virtual machine is determined by the computing tasks and applications it is required to perform.

Another trend that has recently developed is the migration of computing resources (e.g., CPU, memory, disk space, network communication, etc.) from private domains to remotely connected cloud-computing platforms. Applications of various kinds are being executed within such platforms, allowing access to the "economy of scale" environment of cloud-computing platforms.

A new approach to networking has recently emerged to take advantage of the above-mentioned developments. A software defined network (SDN) allows making communication networks flexible and configurable and enables network engineers and administrators to respond quickly to changing network requirements.

In an SDN, the network traffic can be controlled from a centralized controller. This can be achieved through commands issued by the controller to the individual switches. Further, in an SDN, services can be delivered to wherever they are needed in a network, without depending on what any particular hardware device is physically connected to within the network. The key technologies involved are functional separation, network virtualization and automation through programmability.

In a conventional network, a specialized appliance such as a firewall or load balancer is utilized to balance or regulate the traffic. An SDN deploys an application that uses the controller to manage data plane behavior.

Network functions virtualization (NFV) is a network architecture utilizing methods of information technology (IT) virtualization to virtualize entire classes of network node functions into building blocks that may connect, or chain together, to create communication services.

Typically, NFV relies upon, but differs from, traditional server-virtualization techniques, such as those used in enterprise IT. A virtualized network function, or VNF are typically based one or more virtual machines running different software and processes, on top of standard high-volume servers, switches, storage devices, or cloud computing platforms, instead of having custom hardware appliances for each network function.

For example, a virtual session border controller can be deployed to protect a network without the typical cost and complexity of obtaining and installing physical network protection units. Other examples of NFV include virtualized load balancers, virtual firewalls, intrusion detection devices and WAN accelerators.

Both SDNs and NFV networks often allow major economical savings in network expenditures, as well as offer an efficient and flexible manner of inserting changes into a network. However, since various VNFs running as software tasks can be critical tasks, their performance should be constantly maintained at the same level without any degradation. As such, computing resources utilized by such virtualized environments should be readily available at any moment.

However, in many virtualized environments other tasks that are non-network related often share the same hardware resources. As such, a load created by such tasks may consume extensive computing resources and lead to the malfunctioning of some or all of the network functions that rely on the same hardware resources.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for determining optimized resources utilization in a virtual network, the method comprising: collecting at least one computing resource parameter, wherein the at least one computing resource parameter includes at least a measurements of computing resources performance in the virtual network; accessing at least one key performance indicator, where the at least one key performance indicator includes measurement of network traffic performance; determining, based on the at least one computing resource parameter and the at least one key performance indicator, at least one optimized resource parameter over a period of predetermined time interval, wherein the optimized resource parameter indicates a usage rule for a computing resource component.

Certain embodiments disclosed herein include a non-transitory computer readable medium having stored thereon instructions for causing a processing circuitry to perform a method for determining optimized resources utilization in a virtual network, the method comprising: collecting at least one computing resource parameter, wherein the at least one computing resource parameter includes at least measurements of computing resources performance in the virtual network; accessing at least one key performance indicator, where the at least one key performance indicator includes measurement of network traffic performance; determining, based on the at least one computing resource parameter and the at least one key performance indicator, at least one optimized resource parameter over a period of predetermined time interval, wherein the optimized resource parameter indicates a usage rule for a computing resource component.

Certain embodiments disclosed herein include a system for determining resources utilization in a virtual network, the system comprising: a processing circuitry; and a memory, the memory containing instructions that, when executed by the processing circuitry, configure the system to: collect at least one computing resource parameter, wherein the at least one computing resource parameter includes at least measurements of computing resources performance in the virtual network; access at least one key performance indicator, where the at least one key performance indicator includes measurement of network traffic performance; determine, based on the at least one computing resource parameter and the at least one key performance indicator, at least one optimized resource parameter over a period of predetermined time interval, wherein the optimized resource parameter indicates a usage rule for a computing resource component

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
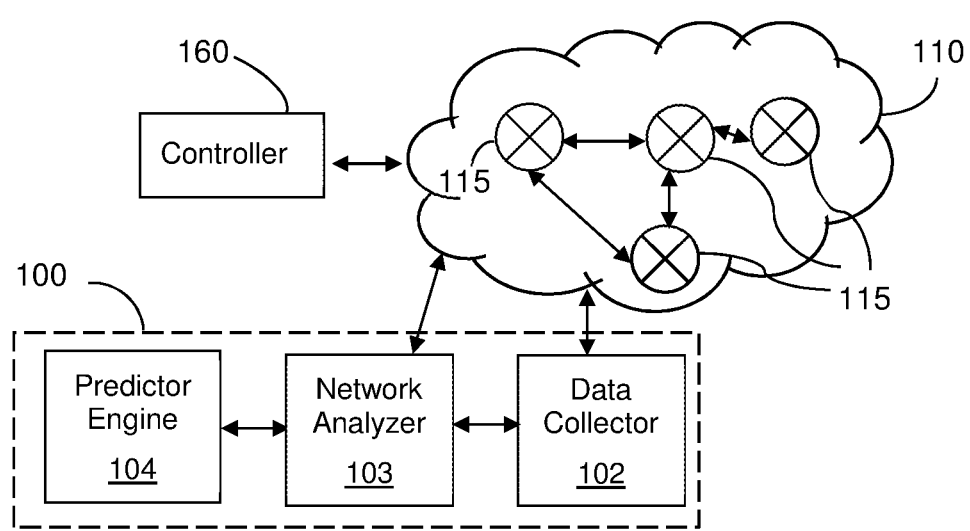
FIG. 1 is a schematic diagram of a network system utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for determining resources utilization in virtualized network environments. In an embodiment, the method includes collecting data about the status of hardware resources and the status of network performance to determine relevant parameters that are indicative of a restriction or overbearing load of at least one network resource. A set of key performance indicators (KPIs) can be used as a reference to ensure that the network is configured to adequately perform critical tasks within a virtualized network environment.

According to some embodiments, the disclosed system includes a predictor engine configured to receive parameters regarding the status of computing resources along with the KPIs over a predetermined period of time. The predictor engine is further configured to predict the resources utilization of the virtualized network environment required when executing a critical task.

FIG. 1 shows an example schematic diagram of a network diagram utilized to describe the various disclosed embodiments. In the deployment illustrated in FIG. 1, a system 100 is utilized to monitor the performance of a virtual network 110. In an example embodiment, virtual network 110 can reside on a server or any similar computing device.

In another example embodiment, the virtual network 110 is a software defined network (SDN). In such deployment, the virtual network 110 includes an optional central controller 160 and a plurality of network nodes 115. The network nodes 115 communicate with the central controller 160 using, for example, an OpenFlow protocol. The central controller 160 can configure the network nodes 115 to perform certain data path operations. The virtual network 110 can be implemented in wide area networks (WANs), local area networks (LANs), the Internet, metropolitan area networks (MANs), ISP backbones, datacenters, inter-datacenter networks, and the like. Each network node 115 in the SDN may be a router, a switch, a bridge, and so on. Each network node 115 is implemented in software, and its implementation can be run either on the physical hardware equipment provided by the server or the computing device, or on a virtual machine (VM) created virtually within the server. The central controller 160 is configured to set rules and policies which govern the flow of network traffic through the network nodes 115.

The system 100 is configured to perform the disclosed embodiments and includes a data collector 102, a network analyzer 103, and a predictor engine 104. In an embodiment, a data collector 102 is connected to the virtual network 110 and configured to access and collect relevant computing resource parameters regarding the status of the computing resources utilized by the network 110. In an embodiment, the collected computing resource parameters are processed by the network analyzer 103 that is configured to analyze the status of the computing resources that are used to implement the functions of the virtual network 110.

The relevant computing resource parameters include, but are not limited to, measurements of current and historical CPU usage, memory usage, and disk space status of the computing environment that is used to implement the virtual network 110, and used by virtualized network functions to execute network tasks. The network analyzer 103 may be compatible with software stacks, such as, but not limited, OpenStack® Ceilometer, Monasca, and the like.

In addition to monitoring the usage of hardware computing resources, the network quality can be measured by the network analyzer 103 by accessing and analyzing KPIs of the network 110. The KPIs may include, but are not limited to, the percentage of network packets lost, the percentage of network procedures that have not been successfully completed, and time taken for the completion of a network task. The KPIs can be represented as real numbers (for example, a number between 0 and 100 for the percentage of packet loss), or as binary numbers representing a pass or a fail for a particular network task.

The network analyzer 103 is further connected to a predictor engine 104. In an embodiment, the predictor engine 104 is configured to receive data from the network analyzer 103 and provides estimates of the future performance of the various network nodes 115. The operation of the system 100 is discussed in more details in FIG. 1.

It should be noted that each of the components of the system 100 including the data collector 102, the data analyzer 103, the predictor engine 104 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In a non-limiting example, the central controller 160 may be software configured to run on a remote server (not shown), where the remote server is additionally used for data analysis. If the data analysis requires heavy hardware resources usage, the network central controller 160 may be unable to adequately perform, resulting in lost or reduced network performance.

Figure 2:
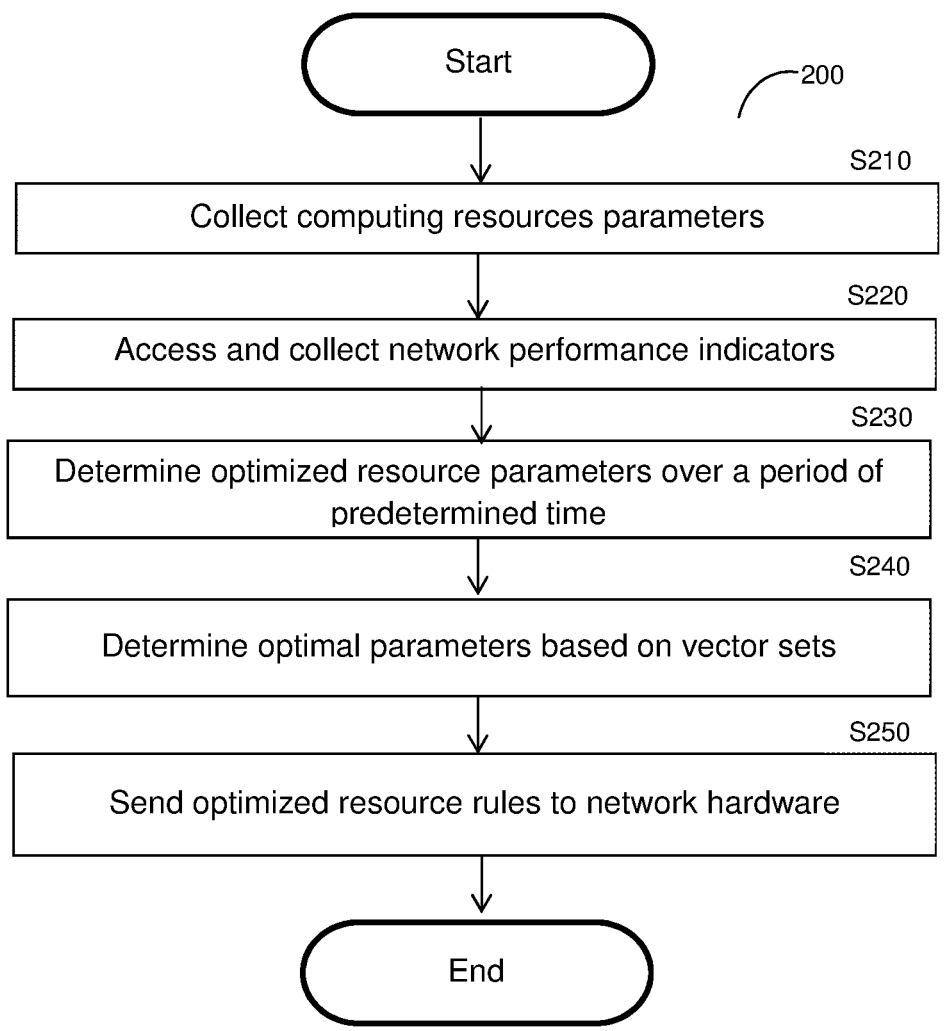
FIG. 2 is a flowchart illustrating a method for determining network optimization parameters according to an embodiment.

FIG. 2 shows an example flowchart 200 illustrating a method for determining network optimization parameters and predicting the network future performance according to an embodiment.

At S210, the computing resources parameters are collected. In an embodiment, the computing resources parameters are repeatedly collected at predetermined intervals. The interval may be designated as a parameter $\Delta T$, where $\Delta T$ can be set to a configurable value. In an embodiment, a lower value of $\Delta T$ offers higher accuracy of computing resource parameter measurements, but requires additional computing resources for calculating such measurements. For example, $\Delta T$ can be set to measure the computing resource parameters every 15 seconds. Examples for computing resource parameter includes at least one of: current and historical central processing unit usage, memory usage, and disk space usage of the computer resources components.

At S220, the network KPIs are additionally accessed and collected. Examples for network KPIs may include at least one of: percentage of network packets lost over a network connection, percentage of network procedures that have not been successfully completed over a network connection, and time taken for the completion of a network task over a network connection.

At S230, both the computing resource parameters and the network KPIs are obtained and used to generate a data model describing the connection between the network's performance and the measurements of the computing resources. The data model may be generated using supervised or unsupervised machine learning techniques.

Using this model, the resource parameters that can be most indicative for predicting future performance of various virtual network functions are determined.

In addition, a set rules for allocation of the computing resources are determined or configured, for example, by the network analyzer 103. For example, if a remote server is experiencing a bottleneck of memory such that a network controller, e.g. the network controller 160 of FIG. 1, is unable to perform its tasks because the host of a remote server is simultaneously offering resources to, for example, a data mining task, the parameters provided to a predictor engine may indicate that a rule should be set for the remote server to allocate a predetermined amount of memory, e.g. 4 gigabytes, for exclusive use by the network controller, thus eliminating the memory bottleneck for the network controller.

At S240, a set of vectors are received in order to determine optimal parameters, as described below. In an embodiment, the most indicative resource parameters are determined via a predetermined set of rules. As a non-limiting example, N computing resource parameters (denoted by $P_1$, $P_2$, ..., $P_N$) are measured over a time interval $[0, M*\Delta T]$ at times $t = k*\Delta T$ (where $k = 0, 1, 2, ..., M$) where, for each of these parameters $P_i$ ($i = 1, 2, ..., N$), its measurements over time are denoted as a vector $\hat{P}_{i_{[t]}}$. Similarly, the KPIs of the network are accessed, collected and measured for every $\Delta T$ during the time interval $[0, M*\Delta T]$.

In one embodiment, the set of the most indicative parameters (which is a subset of $P_1, P_2, ..., P_N$) and denoted as $\overline{P}$, is determined as follows:

1. In each measurement of time t ($t = k*\Delta T$ where $k = 0, 1, 2, ..., M$) of the set of KPIs, a binary indicator I(t) is computed. I(t)=1 if and only if the values of the KPIs indicate that the network is performing without degradation. Otherwise, I(t)=0.

2. For each parameter $\kappa_i$ ($i = 1, 2, ..., N$), an F-Score algorithm in one dimension is applied to the set of tuples ($P_i(t)$, I(t)) $t = k*T$ (where $k = 0, 1, 2, ..., M$).

3. $P_i$ belongs to $\overline{P}$ if and only if its F-score is above a predefined threshold (TH).

In one embodiment, a decision that the network is performing without degradation at a certain time t, is based on the number of measured KPIs that indicate no degradation in that time t. If this number is above a predefined value, then no degradation is declared.

In another embodiment, the set of most indicative parameters $\overline{P}$ is determined by applying a PCA (principal component analysis) dimensionality reduction algorithm to the set of vectors $P_i(t)$ ($i = 1, 2, ..., N$). Other methods for dimensionality reduction such as, but not limited to, a minimum redundancy maximum relevance method, can also be used.

In yet another embodiment, the set $\overline{P}$ is determined by generating new parameters. These can be, but not limited to, the first and second derivatives of the parameters $P_i(t)$ ($i = 1, 2, ..., N$) over time.

The predictor engine 104 is configured to receive inputs of the set of vectors $P_i(t)$ ($i = 1, 2, ..., N$) for $t \leq t_0$ and the values of the measured KPIs for $t \leq t_0$ (i.e., t is equal to or smaller than $t_0$) in order to train a classifier.

In an embodiment, only certain parameters are selected and used to train the classifier. In yet another embodiment those certain parameters can be the set of most indicative parameters selected according to one of the criteria mentioned above, new generated parameters as mentioned above, or a combination thereof. Therefore, the training sequence to the classifier includes the selected set of parameters mentioned above measured at times $t \leq t_0$ (the independent variables) and the set of KPIs measured at times $t \leq t_0$ (the dependent variables).

In an embodiment, the classifier can be trained with the values of I(t) for $t \leq t_0$ instead of the values of the measured KPIs. The classifier can be, but is not limited to, a decision tree classifier, a decision forest classifier, logistic regression and the like.

In yet another embodiment, the classifier can be trained with a time shifted version of the dependent variables by $m*\Delta T$ units. This enables the system 100 and in particular the predictor engine 104 to predict the future performance of network nodes at $m*\Delta T$ time units in the future, based on the availability of computing resources in the present.

In an embodiment, once the classifier is trained, at any given time $t > t_0$, upon receiving the set of chosen parameters at t, the output of the classifier will be the predicted values of the KPIs (or the indicator I) at time $t=t+m*\Delta T$. In a further embodiment, a logistic regression method may be implemented by the predictor algorithm.

At optional S250, rules for changing the allocation of one or more computing resources are sent to network hardware, e.g. a relevant server in the virtual network 110. Following the aforementioned example, a rule is sent to the host of the remote server, to set aside the desired amount of a specific hardware resource, such as memory, for exclusive use by a network node (e.g., one of nodes 115 of FIG. 1).

Figure 3:
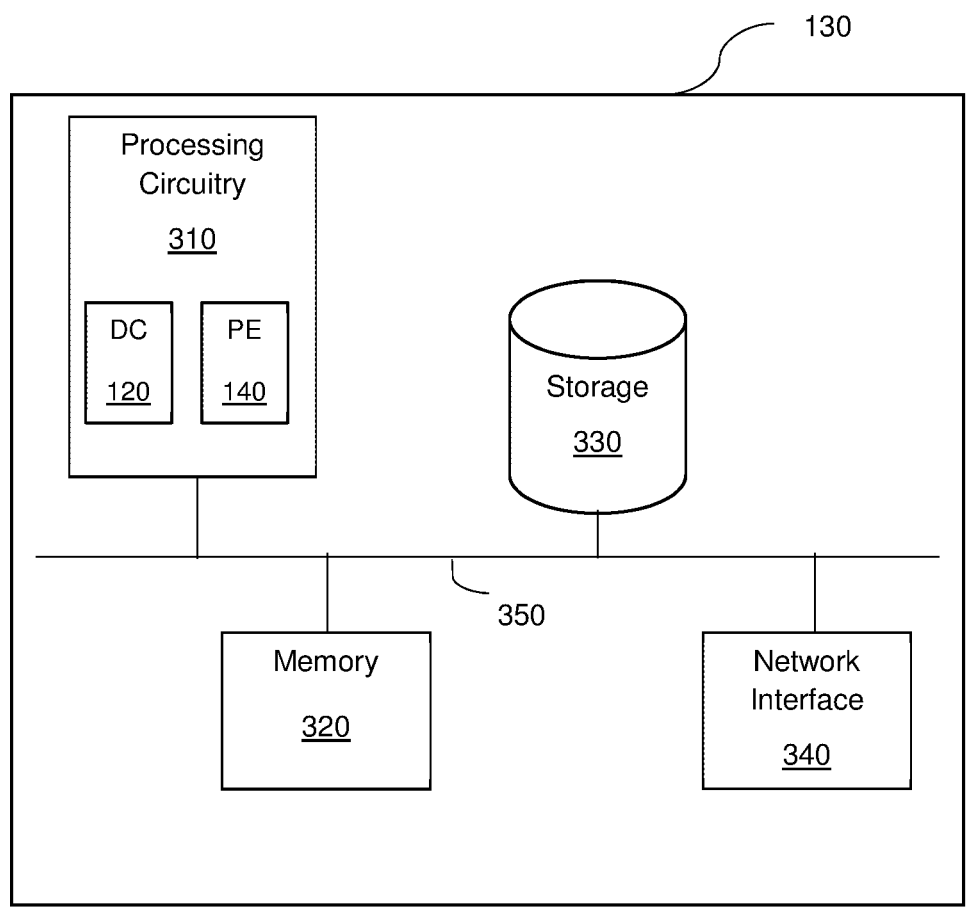
FIG. 3 is a block diagram of a network analyzer realized according to an embodiment.

FIG. 3 shows an example block diagram of the system 100 implemented according to an embodiment. The system 100 includes a processing circuitry 310 coupled to a memory 320, a storage 330, and a network interface 340. In an embodiment, the components of the system 100 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In another embodiment, the memory 320 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 310 to perform the various processes described herein. Specifically, the instructions, when executed, cause the processing circuitry 310 to determine resource utilization in virtual networks, determining network optimization parameters and predicting the network future performance. The methods performed by the circuitry 310 can be utilized to perform the operations of the network analyzer 103, the data collector 102, the predictor engine 104 as discussed in detail above.

The storage 330 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 330 may store the network KPIs and communication consumption patterns associated with one or more communications devices.

The network interface 340 allows the analyzer and the data collector to communicate the central controller 160 and/or various network resources in the virtual network 110 (FIG. 1). It should be understood that the embodiments described herein are not limited to the specific architecture illustrated in FIG. 3, and other architectures may be equally used without departing from the scope of the disclosed embodiments.

That is, the various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for determining optimized resources utilization in a virtual network, comprising:
    collecting at least one computing resource parameter, wherein the at least one computing resource parameter comprises a measurement of computing resources performance in the virtual network;
    collecting at least one key performance indicator, where the at least one key performance indicator includes measurement of network traffic performance;
    determining, based on the at least one computing resource parameter and the at least one key performance indicator, at least one optimized resource parameter over a period of predetermined time interval, wherein the optimized resource parameter indicates a usage rule for a computing resource component;

generating a data model using machine learning techniques, based on the at least one computing resource parameter and the at least one key performance indicator, wherein the data model describes a connection between the virtual network's performance and the collected measurements of the at least one computing resource parameter and the at least one key performance indicator; and configuring the computing resource component with the determined usage rule.

2. The method of claim 1, wherein the at least one computing resource parameter includes at least one of: current and historical central processing unit usage, memory usage, and disk space usage of the computer resources components.

3. The method of claim 1, wherein the at least one key performance indicator includes at least one of: percentage of network packets lost over a network connection, percentage of network procedures that have not been successfully completed over a network connection, and time taken for the completion of a network task over a network connection.

4. The method of claim 1, wherein the at least one computing resource parameter and the at least one key performance indicator are repeatedly collected at predetermined time intervals.

5. The method of claim 1, wherein the data model is further configured to determine which of the computing resource parameters and key performance indicators are most indicative of future network performance.

6. The method of claim 1, further comprising:
predicting future values of the at least one key performance indicator for determining the usage rule.

7. The method of claim 1, wherein the at least one optimized resource parameter is determined by a dimensionality reduction process.

8. A non-transitory computer readable medium having stored thereon instructions for causing a processing circuitry to perform a method for determining optimized resources utilization in a virtual network, the method comprising:
collecting at least one computing resource parameter, wherein the at least one computing resource parameter comprises a measurement of computing resources performance in the virtual network;
accessing at least one key performance indicator, where the at least one key performance indicator includes measurement of network traffic performance;
determining, based on the at least one computing resource parameter and the at least one key performance indicator, at least one optimized resource parameter over a period of predetermined time interval, wherein the optimized resource parameter indicates a usage rule for a computing resource component;
generating a data model using machine learning techniques, based on the at least one computing resource parameter and the at least one key performance indicator, wherein the data model describes a connection between the virtual network's performance and the collected measurements of the at least one computing resource parameter and the at least one key performance indicator; and configuring the computing resource component with the determined usage rule.

9. A system for determining optimized resources utilization in a virtual network, comprising:
a processing circuitry; and
a memory, the memory containing instructions that, when executed by the processing circuitry, configure the system to:
collect at least one computing resource parameter, wherein the at least one computing resource parameter comprises a measurement of computing resources performance in the virtual network;
access at least one key performance indicator, where the at least one key performance indicator includes measurement of network traffic performance;
determine, based on the at least one computing resource parameter and the at least one key performance indicator, at least one optimized resource parameter over a period of predetermined time interval, wherein the optimized resource parameter indicates a usage rule for a computing resource component;
generate a data model using machine learning techniques, based on the at least one computing resource parameter and the at least one key performance indicator, wherein the data model describes a connection between the virtual network's performance and the collected measurements of the at least one computing resource parameter and the at least one key performance indicator; and
configure the computing resource component with the determined usage rule.

10. The system of claim 9, wherein the at least one computing resource parameter includes at least one of: current and historical central processing unit usage, memory usage, and disk space usage of the computer resources components.

11. The system of claim 9, wherein the at least one key performance indicator includes at least one of: percentage of network packets lost over a network connection, percentage of network procedures that have not been successfully completed over a network connection, and time taken for the completion of a network task over a network connection.

12. The system of claim 9, wherein the at least one computing resource parameter and the at least one key performance indicator are repeatedly collected at predetermined time intervals.

13. The system of claim 9, wherein the data model is further configured to determine which of the computing resource parameters and key performance indicators are most indicative of future network performance.

14. The system of claim 9, wherein the system is further configured to:
predict future values of the at least one key performance indicator for determining the usage rule.

15. The system of claim 9, wherein the at least one optimized resource parameter is determined by a dimensionality reduction process.

* * * * *